(12) United States Patent
Tseng

(10) Patent No.: US 8,827,552 B2
(45) Date of Patent: Sep. 9, 2014

(54) METHOD FOR DISPLAYING TEMPERATURE MEASURED BY AN ELECTRONIC THERMOMETER BY PICTURE

(75) Inventor: Chao-Man Tseng, Taipei (TW)

(73) Assignee: K-Jump Health Co., Ltd., New Taipei (TW)

( * ) Notice: Subject to any disclaimer, the term of this patent is extended or adjusted under 35 U.S.C. 154(b) by 346 days.

(21) Appl. No.: 13/232,942

(22) Filed: Sep. 14, 2011

(65) Prior Publication Data
US 2013/0064267 A1   Mar. 14, 2013

(51) Int. Cl.
  *G01K 1/00*   (2006.01)
  *G01K 7/00*   (2006.01)
  *G01K 1/02*   (2006.01)
  *G01K 13/00*   (2006.01)

(52) U.S. Cl.
  CPC ............... *G01K 13/002* (2013.01); *G01K 1/028* (2013.01)
  USPC ................ 374/170; 374/100; 702/131

(58) Field of Classification Search
  USPC ......... 374/163, 162, 100, 170; 702/130–136; 327/241, 335; 600/549, 474
  See application file for complete search history.

(56) References Cited

U.S. PATENT DOCUMENTS

| | | | | |
|---|---|---|---|---|
| 3,440,617 A | * | 4/1969 | Lesti | 382/224 |
| 3,566,095 A | * | 2/1971 | Schmitz | 708/605 |
| 3,798,366 A | * | 3/1974 | Hunt et al. | 374/124 |
| 3,940,752 A | * | 2/1976 | Bair | 340/870.11 |
| 3,942,123 A | * | 3/1976 | Georgi | 324/600 |
| 4,019,368 A | * | 4/1977 | Navato | 374/162 |
| 4,117,723 A | * | 10/1978 | Maravich | 374/183 |
| 4,121,462 A | * | 10/1978 | Mohrman | 374/163 |
| 4,161,880 A | * | 7/1979 | Prosky | 374/171 |
| 4,270,119 A | * | 5/1981 | Mitamura | 341/167 |
| 4,447,884 A | * | 5/1984 | Wada | 702/131 |

(Continued)

FOREIGN PATENT DOCUMENTS

| | | |
|---|---|---|
| DE | 202009006947 U1 | 9/2009 |
| DE | 102009058223 A1 | 6/2011 |

(Continued)

OTHER PUBLICATIONS

Taiwan Official Action issued on Dec. 3, 2013.

(Continued)

*Primary Examiner* — Gail Kaplan Verbitsky
(74) *Attorney, Agent, or Firm* — Chun-Ming Shih; HDLS IPR Services

(57) ABSTRACT

An electronic thermometer capable of displaying temperature by picture includes a body, a micro-controller, a display screen and a temperature-sensing element. The body has a measurement portion. The micro-controller is disposed in the body. The display screen is combined in the body. The temperature-sensing element is provided in the measurement portion and electrically connected to the micro-controller. A temperature signal sensed by the temperature-sensing element is transmitted to the micro-controller. The micro-controller converts the temperature signal into a temperature value comprising a measured integer value and a measured decimal value. The micro-controller converts the measured decimal value into a picture. The display screen is configured to display the measured integer value and the picture. The present invention further provides a method for displaying temperature measured by an electronic thermometer by picture. By displaying a picture representing the temperature, the electronic thermometer increases customer acceptance with regard to visual effect.

8 Claims, 5 Drawing Sheets

(56) References Cited

U.S. PATENT DOCUMENTS

| | | | |
|---|---|---|---|
| 4,565,456 A * | 1/1986 | Iida et al. | 374/169 |
| 4,592,003 A * | 5/1986 | Kobayashi et al. | 702/108 |
| 4,812,835 A * | 3/1989 | Wada et al. | 345/33 |
| 5,552,999 A * | 9/1996 | Polgreen et al. | 702/63 |
| 6,629,776 B2 * | 10/2003 | Bell et al. | 374/170 |
| 6,837,618 B1 * | 1/2005 | Yamamoto et al. | 374/163 |
| 6,967,900 B2 * | 11/2005 | Chapman | 368/10 |
| 7,119,503 B2 * | 10/2006 | Kemper | 315/309 |
| 7,252,431 B1 * | 8/2007 | Caramanna | 374/147 |
| 7,854,550 B2 * | 12/2010 | Chan et al. | 374/208 |
| 2006/0171443 A1 * | 8/2006 | Rund | 374/208 |
| 2010/0302183 A1 * | 12/2010 | Kogo et al. | 345/173 |
| 2010/0314443 A1 * | 12/2010 | Cudzilo | 235/435 |
| 2012/0039529 A1 * | 2/2012 | Rujan | 382/164 |
| 2013/0083965 A1 * | 4/2013 | Joung et al. | 382/103 |
| 2013/0235901 A1 * | 9/2013 | Shin, Jae-Woo | 374/121 |

FOREIGN PATENT DOCUMENTS

| | | |
|---|---|---|
| JP | 61047529 A | 3/1986 |
| JP | 61-050027 A | 12/1986 |
| TW | M347155 A | 12/2008 |

OTHER PUBLICATIONS

China Official Action issued on Oct. 18, 2013.
DE Official Action issued on May 24, 2012.

* cited by examiner

METHOD FOR DISPLAYING TEMPERATURE MEASURED BY AN ELECTRONIC THERMOMETER BY PICTURE

BACKGROUND OF THE INVENTION

1. Field of the Invention

The present invention relates to an electronic thermometer, and in particular to an electronic thermometer capable of displaying temperature by picture.

2. Description of Prior Art

The existing thermometers are classified into two categories including mercury thermometers and electronic thermometers. People use these two kinds of thermometers based on their own habits.

A common mercury thermometer comprises a glass rod and a mercurial column disposed in the glass rod. The degree of elevation of the mercurial column depends on the level it is heated. After the mercurial column rises to a certain degree and stops rising, the final degree pointed by the distal end of the mercurial column represents the correct body temperature. Thus, with regard to the visual effect, the mercury thermometer employs a column-shaped picture to display the temperature, whereby a user can read the temperature value conveniently. On the other hand, the electronic thermometer employs a temperature-sensing element to measure the temperature and then display the measured temperature on a screen by digital numbers.

Since the expansion/contraction of the mercurial column is used to represent the degree of temperature to be measured, the mercury thermometer requires a certain length for accommodating the mercurial column. Further, it is not easy for the user to read the calibrations provided on the mercury thermometer, which affects the accuracy in measuring the temperature. Therefore, the electronic thermometer gradually replaces the traditional mercury thermometer to become a household necessity. However, as for the users who get used to the mercury thermometer, the electronic thermometer can only display the temperature by digital numbers, which is a different way from that of the mercury thermometer with regard to the visual effect, which may affect customer acceptance of the electronic thermometers.

In view of the above, the present Inventor proposes a novel and reasonable structure to solve the problems in prior art based on his expert knowledge and deliberate researches.

SUMMARY OF THE INVENTION

The present invention is to provide an electronic thermometer capable of displaying temperature by picture and a method for displaying temperature thereof. In this way, a picture representing the temperature value can be displayed on the electronic thermometer, which increases customer acceptance with regard to visual effect.

The present invention provides an electronic thermometer capable of displaying temperature by picture, including a body, a micro-controller, a display screen and a temperature-sensing element. The body has a measurement portion. The micro-controller is disposed in the body. The display screen is combined in the body. The temperature-sensing element is provided in the measurement portion and electrically connected to the micro-controller. A temperature signal sensed by the temperature-sensing element is transmitted to the micro-controller. The micro-controller converts the temperature signal into a temperature value comprising a measured integer value and a measured decimal value. The micro-controller converts the measured decimal value into a picture. The display screen is configured to display the measured integer value and the picture.

The present invention provides a method for displaying a temperature measured by an electronic thermometer by picture, including steps of: (a) providing a thermometer having a micro-controller, a temperature-sensing element and a display screen; (b) deciding a critical temperature, and storing the critical temperature in the micro-controller; (c) converting a signal measured by the temperate-sensing element into a measured temperature by the micro-controller, the measured temperature comprising a measured integer value and a measured decimal value; (d) converting the measured decimal value into a picture by the micro-controller; and (e) displaying the measured integer value and the picture on the display screen.

In comparison with prior art, the present invention employs the micro-controller to perform an operation for processing a bar chart. According to the temperature measured by the thermometer, the digital numbers and the picture displayed on the display screen are changed. The digital numbers and the picture are used to display the degree of temperature, which increases customer acceptance of the electronic temperature with regard to the visual effect.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Figure 1:
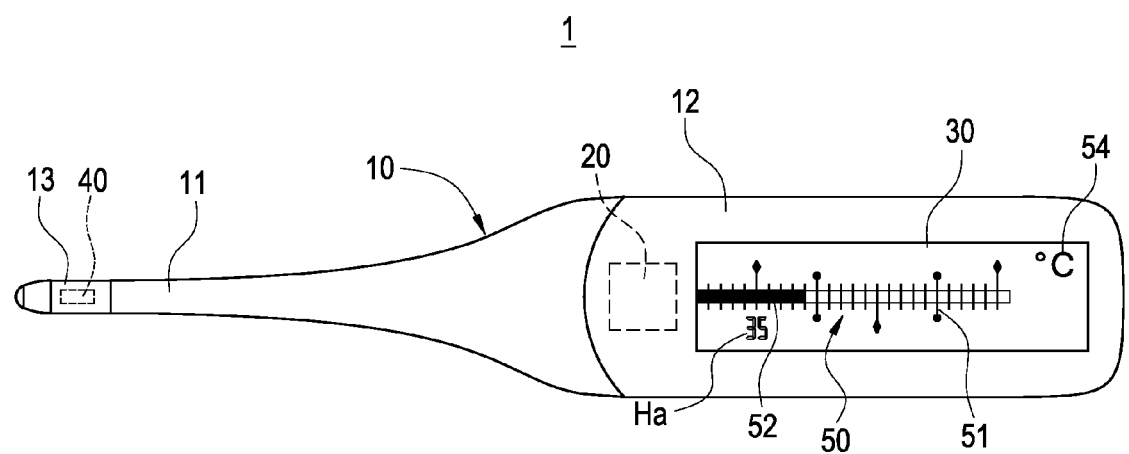
FIG. 1 is a plan view showing the electronic thermometer capable of displaying temperature by picture according to the present invention.

Please refer to FIG. 1, which is a plan view showing the electronic thermometer capable of displaying temperature by picture according to the present invention. The thermometer 1 of the present invention comprises a body 10, a micro-controller 20, a display screen 30 and a temperature-sensing element 40.

The body 10 comprises a pointed section 11 and a handhold section 12 extending from the pointed section 11 with an increasing width. The body 10 has a measurement portion 13. In the present embodiment, the body 10 is a transparent pipe.

The measurement portion 13 is provided on the front end of the pointed section 11. In practice, the material of the body 10 is not limited to specific one, and the body 10 may be made of glass or plastic materials. When the body 10 is made of opaque materials, the body 10 is provided with an opening for allowing the display screen 30 to be disposed therein.

The micro-controller 20 is disposed in the body 10 for performing an operation after the measurement. The display screen 30 is a crystal liquid display screen combined in the body 10 for displaying a picture after the measurement.

The temperature-sensing element 40 is disposed in the measurement portion 13 and electrically connected to the micro-controller 20. A temperature signal sensed by the temperature-sensing element 40 is transmitted to the micro-controller 20. The micro-controller 20 converts the temperature signal into a temperature value H. The temperature value H comprises a measured integer value Ha and a measured decimal value Hb. The micro-controller 20 processes and converts the measured decimal value Hb into a picture 50. The display screen 30 displays the measured integer value Ha and the picture 50.

In the present invention, the picture 50 comprises a plurality of calibrations 51 arranged at equal intervals, an indication line 52 perpendicular to the calibrations 51 to cover a portion of the calibrations 51, and a temperature unit 54.

Figure 2:
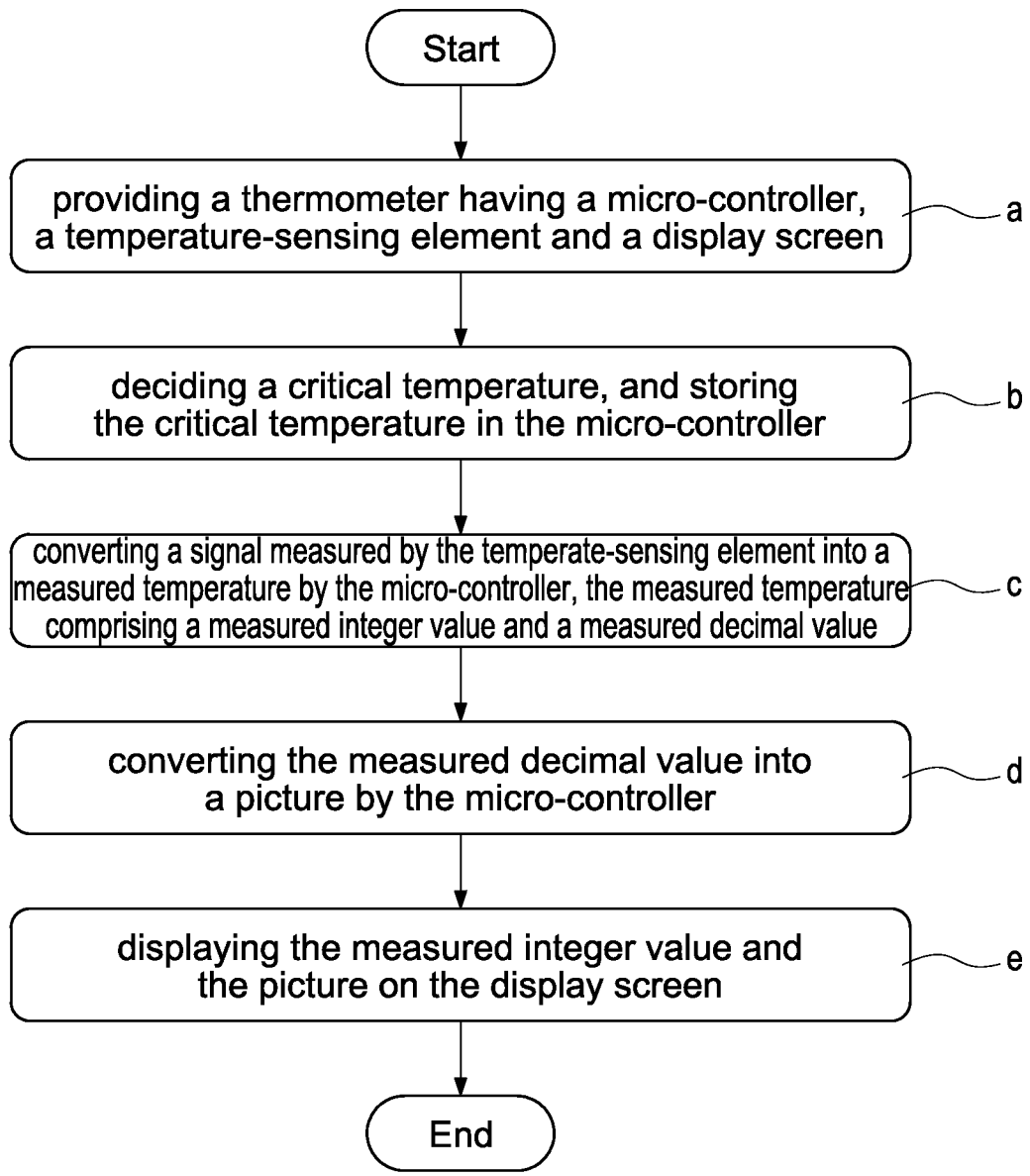
FIG. 2 is a flow chart view showing the method for displaying the temperature measured by the electronic thermometer of the present invention.

Please refer to FIG. 2, which is a flow chart showing the method for displaying temperatures measured by the thermometer according to the present invention. The method includes steps of: (a) providing a thermometer 1 having a micro-controller 20, a display screen 30 and a temperature-sensing element 40; (b) deciding a critical temperature T (fever temperature), storing the value of the critical temperature T into the micro-controller 20; (c) converting a measurement signal measured by the temperature-sensing element 40 into a measured temperature H by the micro-controller 20, the measured temperature H comprising a measured integer value Ha and a measured decimal value Hb; (d) converting the measured decimal value Hb into a picture 50 by the micro-controller 20; and (e) displaying the measured integer value Ha and the picture 50 on the display screen 30.

Figure 3:
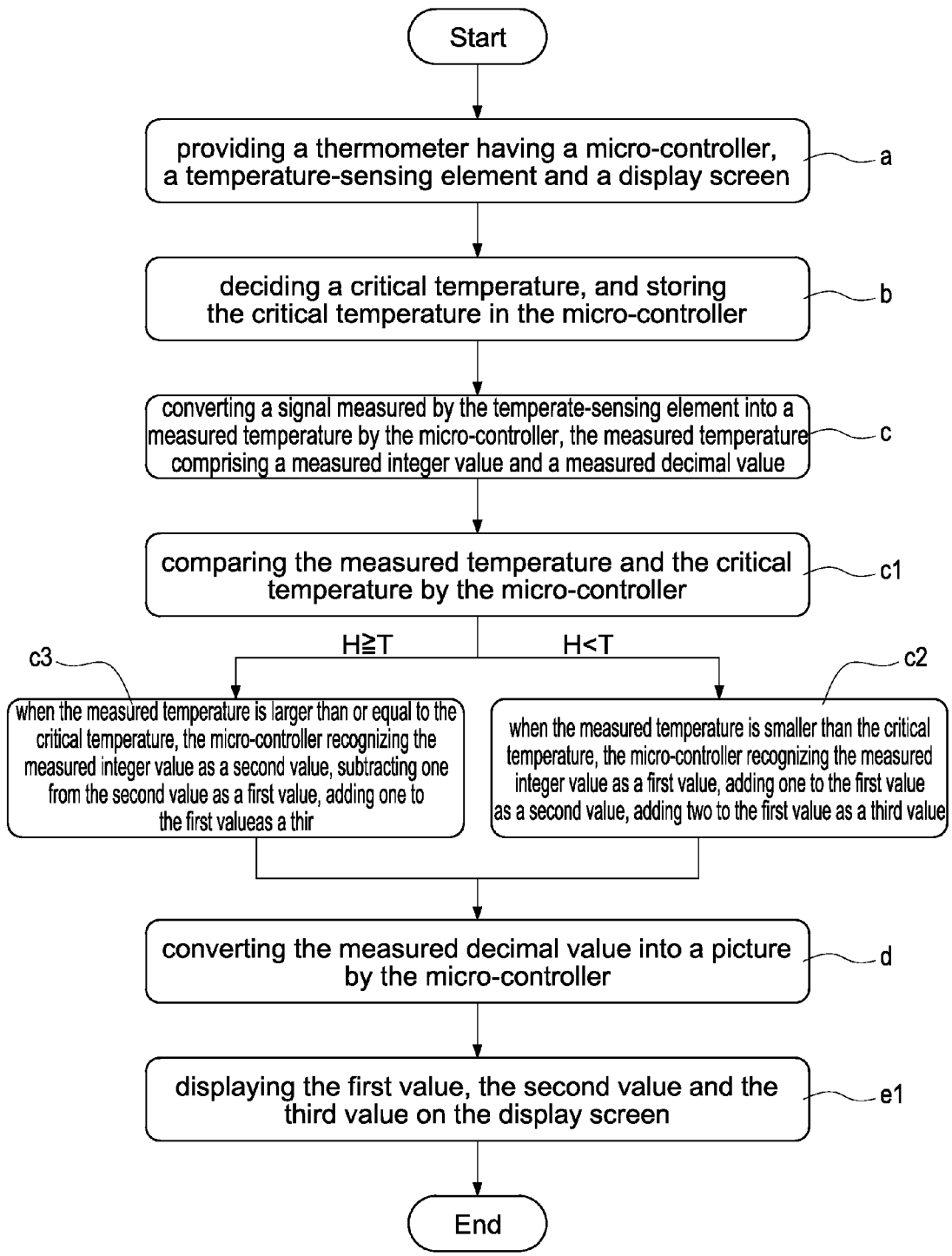
FIG. 3 is another flow chart view showing the method for displaying the temperature measured by the electronic thermometer of the present invention.

Please refer to FIG. 3 again, which is another flow chart showing the method for displaying temperature measured by the thermometer. The method further includes steps: (c1) comparing the measured temperature H and the critical temperature T by the micro-controller 20; (c2) when the measured temperature H is smaller than the critical temperature T, the micro-controller 20 recognizing the measured integer value Ha as a first value 531, adding one to the first value 531 as a second value 532, adding two to the first value 531 as a third value 533; (c3) when the measured temperature H is larger than or equal to the critical temperature T, the micro-controller 20 recognizing the measured integer value Ha as a second value 532, subtracting one from the second value 532 as a first value 531, adding one to the first value 531 as a third value 533; and (e1) displaying the first value 531, the second value 532, and the third value 533 (comprising the picture 50) on the display screen 30.

Figure 4:
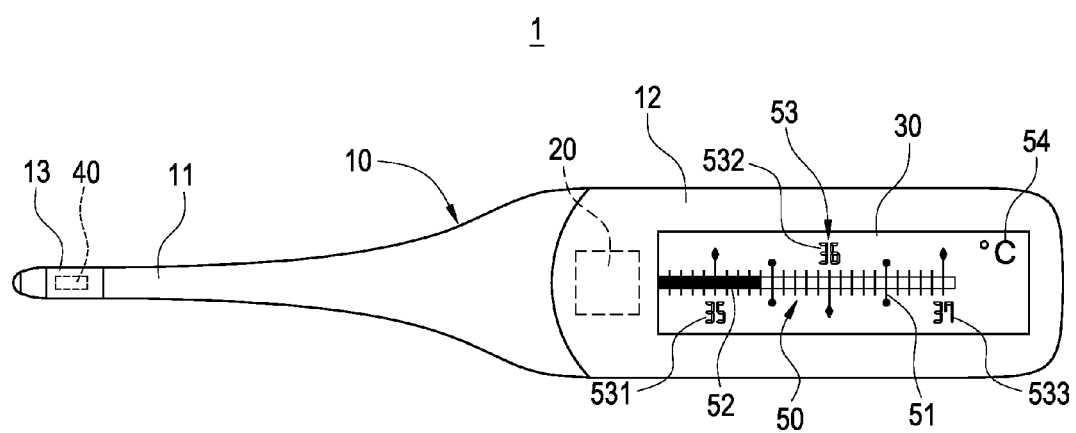
FIG. 4 is another plan view showing the electronic thermometer capable of displaying temperature by picture according to the present invention.

Please refer to FIG. 4, which is another plan view showing the thermometer capable of displaying temperature by picture. In the above-mentioned method, it is assumed that the temperature-sensing element 40 of the present invention is accurate to the first decimal place. The picture 50 comprises a plurality of calibrations 51 arranged at equal intervals, an indication line 52 perpendicular to the calibrations 51 to cover a portion of the calibrations 51, a plurality of digital numerals 53, and a temperature unit 54. The digital numerals 53 are located on one side of the calibrations 51 (located on the same side or both sides). The digital numerals 53 comprises at least three continuous integer values, including a first value 531, a second value 532 and a third value 533 in an increasing order. Ten calibrations are provided among the respective integer values (between the first value 531 and the second value 532 as well as between the second value 532 and the third value 533). The pitch between the respective calibrations is 0.1. The calibration 51 representing the measured decimal value Hb is covered by the indication line 52. When the measured temperature H is smaller than the critical temperature T, the indication line 52 also covers the all calibrations on the left side of the first value 531. On the other hand, when the measured temperature H is larger than or equal to the critical temperature T, the indication line 52 covers the all calibrations on the left side of the second value 532.

Figure 5:
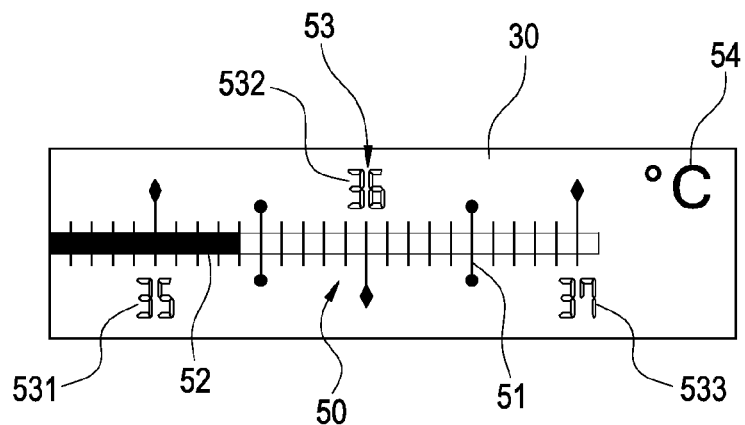
FIG. 5 is a schematic view showing the operation of the electronic thermometer capable of displaying temperature by picture according to the present invention.

Please refer to FIG. 5 again, which is a schematic view showing the operation of the electronic thermometer capable of displaying temperature by picture. FIG. 5 shows the normal temperature of a human body. The critical temperature T is set as 37° C. When the micro-controller 20 receives a measured temperature H of 35.4° C. (that is, Ha=35, Hb=0.4). Since the H (35.4° C.) is smaller than T (37° C.), the display screen 30 displays at least three digital numbers, which includes a first value 531 of 35 (Ha), a second value 532 of 36 (adding one to Ha), and the third value 533 of 37 (adding two to Ha). The indication lines 52 cover the all calibrations on the left side of the digital numbers 35 and four calibrations embraced by the measured decimal value Hb (0.4) on the right side of the digital number 35.

Figure 6:
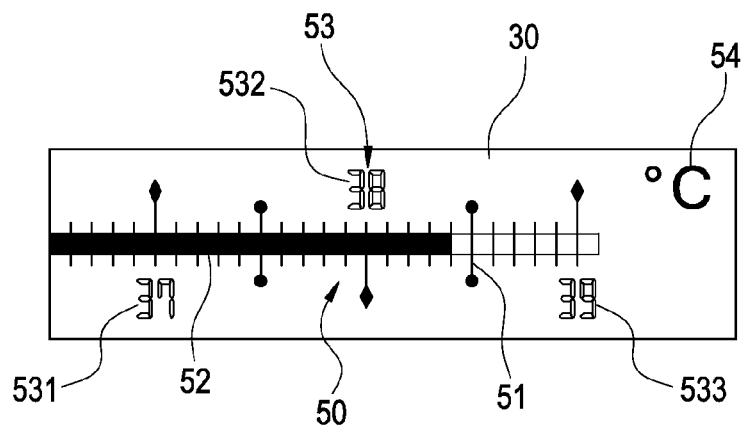
FIG. 6 is another schematic view showing the operation of the electronic thermometer capable of displaying temperature by picture according to the present invention.

Please refer to FIG. 6 again, which is another schematic view showing the operation of the electronic thermometer capable of displaying temperature by picture according to the present invention. FIG. 6 shows a fever temperature. The critical temperature T is set as 37° C.

When the micro-controller 20 receives a measured temperature H of 38.4° C. (that is, Ha=38, Hb=0.4). Since the H (38.4° C.) is larger than T (37° C.), the display screen 30 displays at least three digital numbers, including a first value 531 of 37 (subtracting one from Ha), the second value 532 of 38 (Ha), and the third value 533 of 39 (adding one to Ha). The indications line 52 covers the all calibrations on the left side of the digital numbers 38 and four calibrations embraced by the measured decimal value Hb (0.4) on the right side of the digital numbers 38.

Figure 7:
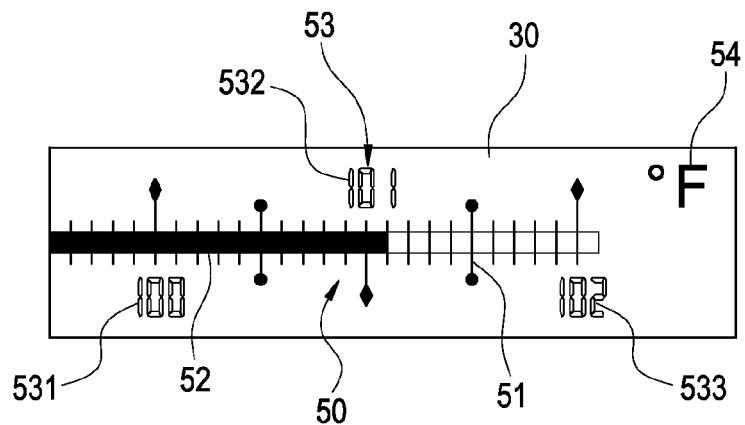
FIG. 7 is a schematic view showing the electronic thermometer capable of displaying temperature by picture according to another embodiment of the present invention.

Please refer to FIG. 7, which is a schematic view showing the thermometer capable of displaying temperature by picture according to another embodiment of the present invention. When the thermometer 1 is in use, Celsius Degree and Fahrenheit Degree can be switched for measuring the temperature. If the user chooses the Fahrenheit Degree, the temperature unit 54 will display in Fahrenheit (° F.). A program of switching Celsius Degree and Fahrenheit Degree is stored in the micro-controller 20 for proper operation, so that a result after the operation of the micro-controller 20 can be displayed on the display screen 30 by a bar picture 50. The method for displaying the measured temperature by picture is substantially the same as the above, so that the description thereof is omitted for simplicity.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A method for displaying a temperature measured by an electronic thermometer by picture, including steps of:
   (a) providing a thermometer having a micro-controller, a temperature-sensing element and a display screen;
   (b) deciding a critical temperature, and storing the critical temperature in the micro-controller;
   (c) converting a signal measured by the temperate-sensing element into a measured temperature by the micro-controller, the measured temperature comprising a measured integer value and a measured decimal value;
   (c1) comparing the measured temperature and the critical temperature by the micro-controller;
   (c2) when the measured temperature is smaller than the critical temperature, the micro-controller recognizing the measured integer value as a first value, adding one to the first value as a second value, adding two to the first value as a third value;
   (c3) when the measured temperature is larger than or equal to the critical temperature, the micro-controller recognizing the measured integer value as a second value, subtracting one from the second value as a first value, adding one to the first value as a third value;
   (d) converting the measured decimal value into a picture by the micro-controller;
   (e) displaying the measured integer value and the picture on the display screen; and
   (e1) displaying the first value, the second value and the third value on the display screen.

2. The method according to claim 1, wherein the picture further includes a temperature unit located at a corner of the display screen, the temperature unit is Celsius degree or Fahrenheit degree.

3. The method according to claim 1, wherein the picture comprises a plurality of calibrations arranged at equal intervals and an indication line perpendicular to the calibrations to cover a portion of the calibrations.

4. The method according to claim 3, wherein the first value, the second value and the third value are located on one side of the calibrations in an increasing order.

5. The method according to claim 4, wherein ten calibrations are respectively provided between the first value and the second value as well as between the second value and the third value, the pitch between the respective calibrations is 0.1.

6. The method according to claim 3, wherein the calibration representing the measured decimal value is covered by the indication line.

7. The method according to claim 6, wherein the indication line covers all the calibrations on the left side of the first value when the measured temperature is smaller than the critical temperature.

8. The method according to claim 6, wherein the indication line covers all the calibrations on the left side of the second value when the measured temperature is larger than the critical temperature.

* * * * *